UNITED STATES PATENT OFFICE.

GEORGE ANDERS, OF GALESBURG, ILLINOIS.

INSECTICIDE.

1,063,313. Specification of Letters Patent. Patented June 3, 1913.

No Drawing. Application filed August 26, 1912. Serial No. 717,086.

*To all whom it may concern:*

Be it known that I, GEORGE ANDERS, a citizen of the United States, and a resident of Galesburg, in the county of Knox and State of Illinois, have invented a new and useful Insecticide, of which the following is a specification.

My improved insecticide is prepared from the following ingredients, combined in substantially the proportions stated, namely:

| | |
|---|---|
| Phenol (carbolic acid), crude | 1 quart. |
| Aqua ammonia, concentrated | 1 pint. |
| Oil of cedar | 2 ounces. |
| Sulfate of zinc | 1 ounce. |
| Sugar of lead | 2 ounces. |
| Oil of sassafras | 4 ounces. |
| Oil of spike | 4 ounces. |
| Corrosive sublimate | 20 grains. |

The ingredients are to be thoroughly commingled, preferably by stirring or agitation. The sulfate of zinc and acetate of lead (or sugar of lead) when mixed in solution form respectively acetate of zinc and sulfate of lead, and the latter will be precipitated. The zinc acetate will at once react with the ammonia water and will all be converted into zinc hydroxid, which, like the lead sulfate, is insoluble. The corrosive sublimate also will be acted on by the ammonia resulting in the formation of mercuric ammonium chlorid. An excess of ammonia water will remain. The anhydrous salts of the lead acetate and zinc sulfate are referred to in the formula above, and are in combining or substantially combining proportions, and no material excess of either will remain. When the zinc acetate reacts with ammonia water one of the reaction products will be ammonium acetate.

For all ordinary purposes the desired quantity of the compound is placed in an ordinary vessel not affected by any of the respective ingredients, and a sufficient quantity of water mixed therewith until the whole assumes the color of milk.

In using the mixture various ways and means may be employed. It may be disseminated in the form of vapor by the employment of a sprayer; it may be applied with a swab or a brush; and it may be used by pouring it into the crevices, cracks and other hiding places of insects. Undiluted it will be found effective in killing bacteria and germs, and it may be successfully employed both as a disinfectant and a deodorizer.

The proportions may vary to any unessential extent.

I claim and desire to secure by Letters Patent the following, to-wit:—

The herein described insecticide consisting of phenol, lead sulfate, zinc hydroxid, mercuric ammonium chlorid, ammonia water, ammonium acetate, oil of cedar, oil of sassafras and oil of spike.

In witness whereof I hereunto sign my name at Bowen in the county of Hancock and State of Illinois, this 13th day of February, 1912.

GEORGE ANDERS.

In presence of—
GEO. W. NASH,
CHARLES CROSSLAND.